Jan. 25, 1966    E. EISNER    3,231,836
DELAY LINES WITH GAS LUBRICATED BEARINGS
Filed Sept. 4, 1963

INVENTOR
E. EISNER
BY
H. O. Wright
ATTORNEY

United States Patent Office 3,231,836
Patented Jan. 25, 1966

3,231,836
DELAY LINES WITH GAS LUBRICATED BEARINGS

Edward Eisner, Bernardsville, N.J., assignor to Bell Telephone Laboratories, Incorporated, New York, N.Y., a corporation of New York
Filed Sept. 4, 1963, Ser. No. 306,581
5 Claims. (Cl. 333—30)

This invention relates to acoustic and/or ultrasonic delay lines. More particularly, it relates to elongated delay lines which may be difficult to support without the introduction of objectionable damping or may be subject to spurious vibrations.

Delay lines have numerous important uses such, for example, as in information storage arrangements, in fixed target elimination arrangements for moving target indicating radars, in pulse code generation and pulse code recognition arrangements for mobile radio and other communication systems and the like.

In many of its uses it is necessary that a delay line be of moderate or even very small cross-sectional area and of a length many times greater than its maximum cross-sectional dimension. Such an element, is of course, difficult to support without introducing objectionable damping and may further involve the problem that vibrations representing, for example, the desired information to be transmitted along the delay line, or mechanical agitation or other "noise" resulting from ambient disturbances, may couple to unwanted modes of variation such as flexible modes of the over-all delay line and distort or otherwise interfere with the transmission of the information carrying vibrations. Problems of these types may obviously be aggravated where the apparatus is used in mobile land, water or airborne vehicles.

Prior art arrangements designed to support long delay lines and/or to prevent or eliminate spurious modes of vibration have usually relied upon the use of arrangements which introduce appreciable damping and distortion of the signal carrying vibrations.

In accordance with the present invention, it is proposed to support the delay line on a plurality of gas lubricated bearings spaced along the line at irregular intervals such that, by way of a specific example, the principal modes of flexural vibration and other modes of spurious or unwanted vibration of the elongated delay line are substantially eliminated without appreciably damping or distorting the signal carrying vibrations. As a further feature of the invention, a number of devices are suggested which combine the function of support with transducing and/or related functions.

The present state of the theory, the mathematical formulation and the physical design of gas lubricated bearings are discussed at length in the report on the "First International Symposium on Gas Lubricated Bearings," ACR-49, published by the Office of Naval Research, Department of the Navy, Washington, D.C., October 26–28, 1959.

Outstanding advantages of gas lubricated bearings are that they can operate satisfactorily over a very wide temperature range since gases may be chosen which neither freeze at very low temperature nor melt, vaporize or otherwise change phase at very high temperatures.

Where clean gas, such as properly filtered air, various substantially inert gases, and the like, are employed the "lubricant" obviously does not give off vapors, as do oils and greases, which vapors frequently contaminate the surrounding environment including adjacent apparatus.

A further advantage is that gas lubricated bearings are characterized by very low friction and consequently generate substantially no heat, produce negligible damping and in general dissipate very little energy.

In short, gas lubricated bearings are simple, quiet, reliable, have low friction, operate satisfactorily over a very wide temperature range and range of speeds, do not introduce contamination of surrounding areas or apparatus and have extremely long fault-free and maintenance free operating life.

Accordingly, a principal object of the present invention is to substantially eliminate energy losses and damping and distortion of signal carrying vibrations by supports in an elongated delay line.

A further object is to substantially reduce spurious vibrations and simplify the structure of an elongated delay line.

A still further object is to increase the stability, efficiency and utility of devices employing elongated delay lines.

Other objects, features and advantages of the invention will become apparent from a perusal of the following specification and detailed description of specific illustrative embodiments of the invention as shown in the accompanying drawing, in which.

Figure 1:
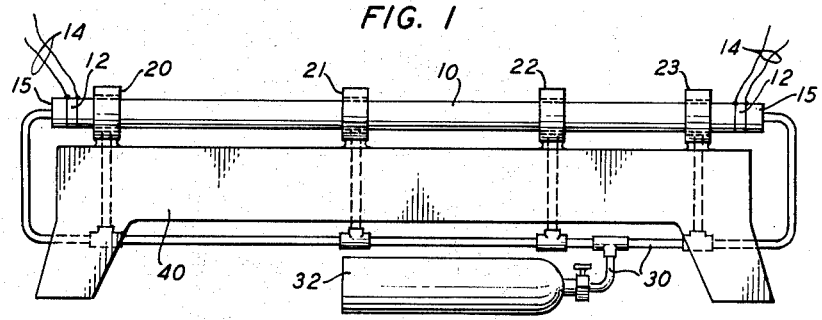
FIG. 1 shows in diagrammatic form one arrangement of the invention.

In more detail in FIG. 1, delay line 10 may be, for example, a cylindrical rod of fused silica or a rod or wire of a resilient metal such as nickel, iron, steel, aluminum and various alloys thereof, having a length which is many times its diameter.

Input transducer 12 and electrical leads 14 connecting thereto at the left end of delay line 10 are provided to convert electrical to acoustic or ultrasonic vibratory energy and impress it upon the left end of the delay line 10 whence it travels to the right, and at the right end of delay line 10 output transducer 12 is provided to reconvert the acoustic or ultrasonic vibratory energy to electrical energy.

Numerous suitable forms of transducers are well known and widely used by those skilled in the art. For example, they may be of piezoelectric material such as quartz, barium titanate or the like, or of magnetostrictive material such as iron or nickel, or they may be of the depletion layer or epitaxial layer types and the like. (See copending applications, D. L. White, Serial No. 64,808, filed October 25, 1960, and D. L. White, Serial No. 208,185, filed July 3, 1962, both assigned to applicant's assignee.) A still further type of transducer which may be employed is that disclosed in United States Patent No. 3,037,174, granted May 29, 1962 to H. E. Bommel and K. Dransfeld.

The acoustic or ultrasonic vibratory energy waves transmitted along the delay line may be longitudinal or transverse, the latter including, of course, torsional waves as well as shear waves.

Several specific forms of the numerous types of transducers suitable for use with various types of delay lines are shown, by way of further example, in United States Patents Nos. 2,514,080; 2,573,168; 2,838,695; 2,838,696; 2,828,470 and 2,880,334.

Whatever the type of transducer and acoustic or ultrasonic wave employed, the delay line 10, in view of its extended length, will preferably require support at a number of points distributed along its length. It may also have a tendency to vibrate in particular flexure and other spurious modes particularly if it is employed in a moving vehicle. To provide adequate supports which will not absorb the acoustic or ultrasonic signals (usually pulses) being transmitted along the line and at the same time to limit vibration in flexural and other spurious modes which may introduce distortion of the signal energy or even result in mechanically damaging the delay line, the delay line 10 may be supported at intervals by a plurality of gas lubricated bearings represented by bearings 20 through 23, inclusive. The intervals between successive bearings should preferably be such that flexural vibrations of low frequency are effectively suppressed. For example, if bearings 20 and 23 are substantially at their respective ends of the line, the intervals between successive bearings should differ substantially from values that have a large common factor. Thus if, as in FIG. 1, four bearings are employed, the use of equal intervals of one-third the length of the line between bearings would not tend to suppress the low frequency flexural vibrations of the line, whereas spacing one of the intermediate bearings at one-quarter and the other at one-third of the length of the line from its respective nearer end bearing (giving intervals 3:5:4) would effectively suppress the said vibrations.

A thrush bearing 15 also of the gas lubricated type may be provided at each end of the delay line assembly to prevent longitudinal displacement particularly where the line is employed in a mobile vehicle. Member 40 is a supporting member which serves to support the bearings and pipe or tubing 30 as indicated. The latter, of course, supplies each bearing with a gas which may be clean air or an inert gas such as nitrogen from the source of compressed gas 32.

Various gases other than air may be advantageously employed in some instances as discussed in the above-mentioned report ACR–49 but for the majority of purposes of the present invention clean air will ordinarily be entirely satisfactory.

Figure 2A:
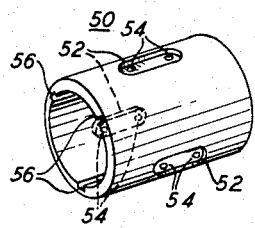
FIG. 2A shows to a somewhat enlarged scale a highly developed form of journal bearing suitable for use with heavier delay line assemblies in arrangements of the invention.
Figure 2B:
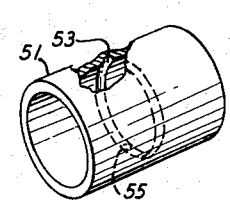
FIG. 2B shows, also to an enlarged scale, a simpler form of journal bearing suitable for use with light assemblies of the invention.

Since the surfaces of a delay line are in many applications not continuously in motion, it is preferable that the "externally pressurized" gas lubricated type of bearing be used as described in the above-mentioned Naval Research report ACR–49. As the designation indicates, an "externally pressurized" bearing requires an external source of gas under pressure. "Gas lubricated" bearings are bearings in which a film of gas is maintained between the journal and the bearing in lieu of the more conventional film of oil, grease or the like. In general very small clearances must be maintained between the journals and the bearing surfaces of gas lubricated bearings as discussed in detail in the report ACR–49. A detailed design of a highly developed type of "externally pressurized" gas lubricated journal bearing is shown in FIG. 2 on page 386 of the report and reproduced as FIG. 2A of the accompanying drawing. A simpler bearing wich will suffice for all but the heaviest types of delay lines is shown in FIG. 2B.

As indicated in FIG. 1 of the accompanying drawing, a source of compressed gas 32 arranged in any of numerous ways well known to those skilled in the art to provide such gas as may be required at a substantially constant pressure is connected via pipe or tubing 30 to each of the bearings 20 through 23, inclusive, and to thrust bearings 15 when employed. As will be apparent from the description below of the highly refined type of bearing shown in FIG. 2, each bearing may, for heavier delay line assemblies, include multiple apertures spaced around the bearing. When such bearings are employed, connections to all apertures of each bearing must, of course, be made to pipe or tubing 30, in any of numerous ways not shown but well known and readily devised by those skilled in the art, the showing in FIG. 1 being merely diagrammatic.

Since the weight to be supported on each bearing of a typical delay line is usually quite nominal, as for example, a few grams, the pressure of the gas furnished by source 32 need not be very great, for example, in the order of one or two pounds per square inch maximum. The volume of gas to be furnished for all the bearings of a typical line will also be quite nominal, that is, in the order of a cubic foot or so per minute. The gas should be passed through appropriate conventional filtering means (not shown) to remove dust and other foreign particles before it is injected into the bearings.

In FIG. 2A a hollow cylindrical journal bearing 50 adapted for use as an "externally pressurized" gas lubricated bearing in relatively heavier delay line arrangements of the general type represented diagrammatically in FIG. 1 is shown. Three recesses 52 each having two apertures 54 are spaced at equal angles of 120 degrees around the center portion of the bearing. Three small longitudinal slots 56 are similarly spaced on the inner surface of the bearing at equal angles of 120 degrees, each slot being midway between two of the recesses 52. These slots add stability to the bearing as discussed in the above-mentioned report ACR–49.

For small, light delay lines, the refinements such as the multiple apertures and the longitudinal slots may be dispensed with and the bearing 51 illustrated in FIG. 2B supplied by a single central aperture 55 through the underside of the bearing may be used. A centrally positioned internal groove 53 is usually provided to permit free distribution of the injected gas around the bearing.

Figure 3:
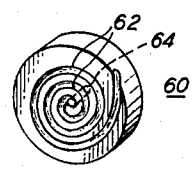
FIG. 3 illustrates a simple type of gas lubricated thrust bearing for devices of the invention.

In FIG. 3 a conventional type of externally pressurized gas lubricated thrust bearing plate is illustrated and comprises a plate 60 having on its near face a spiral groove 62. A tubular opening 64 extending from the inner or centrally located end of spiral groove 62 to the reverse side of the plate is provided for connection to a source of compressed gas such as source 32 of FIG. 1. Bearings 15 of FIG. 1 can employ plates of this type in which case the outer ends of the respective left and right transducers 12 are ground flat and smooth to serve as the other surface of a complete externally pressurized, gas lubricated thrust bearing, a cushion of air forming between the grooved face of plate 62 and the adjacent transducer end. This and several alternative forms of externally pressurized gas lubricated thrust bearing plates are disclosed and described in detail at pages 18 through 20, inclusive, of the above-mentioned report ACR–49.

Figure 4:
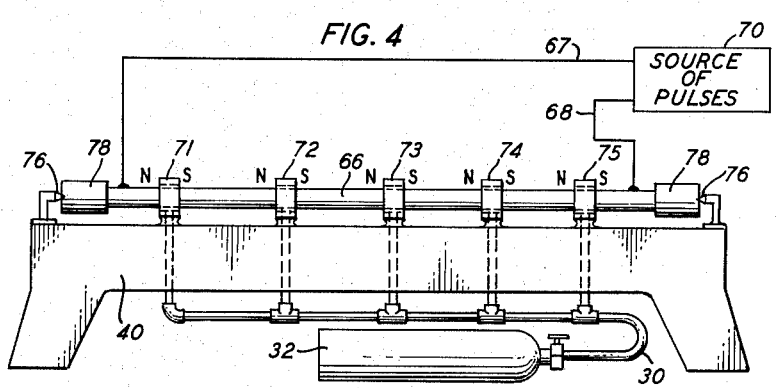
FIG. 4 illustrates in diagrammatic form a further arrangement of the invention in which the journal bearings also serve to magnetically polarize short lengths of the magnetostrictive line employed in this arrangement.

In FIG. 4 a further arrangement of the invention is shown. It comprises a delay line of the general type disclosed in the copending application of W. P. Mason, Serial No. 852,725, filed November 13, 1959, and assigned to applicant's assignee.

This application matured as Patent No. 3,129,395, granted April 14, 1964.

Figure 5:
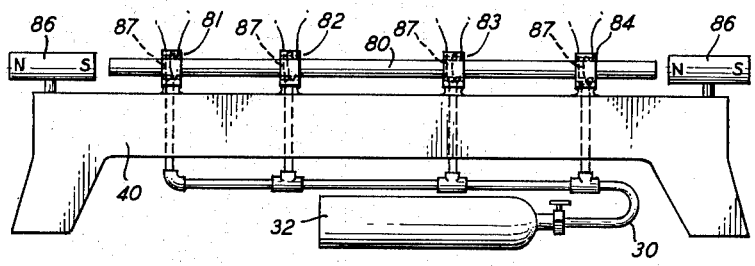
FIG. 5 illustrates a magnetostrictive delay line in which the bearings also act as an electromagnetic type of electromechanical transducer.

In this type of delay line, the line proper 66 is, for example, a rod or wire of magnetostrictive material such as iron or nickel. Magnets 71 through 75, inclusive, are spaced along the line 66, usually at odd and varying intervals, and magnetically polarize the portions of line 66 which pass through them. When an alternating current electrical pulse from source 70 is passed, via leads 67 and 68, along line 66, a torsional acoustic or ultrasonic pulse is generated at each polarized portion of the line and is propagated toward both ends of the line 66 so that, as taught in the above-mentioned Mason application, a group of spaced pulses is received by each transducer 78. In the system as illustrated in FIG. 4, each transducer 78 will receive five pulses, the spacings between pulses being determined of course by the respective distances between the transducer and the point along the line at which each of the pulses, respectively, originated. The order of arrival of pulses from their respective points of origin will of course be the inverse at the left transducer 78 of that at the right transducer 78, since, for example, magnet 75 is the farthest from the left transducer but the nearest to the right transducer, et cetera. Transducers 78 can, for example, be of one of the types illustrated in Patents Nos. 2,880,334 and 2,828,470 (FIGS. 5 and 6). Obviously, each transducer may be supported by an externally pressurized, gas lubricated journal bearing (not shown) if the mechanical design is such as to make direct support of each transducer preferable.

Magnets 71 through 75, inclusive, are further arranged to act as externally pressurized gas lubricated bearings as described for the bearings 20 through 23, inclusive, of FIG. 1. Accordingly, they are connected by a pipe or tubing 30 to a source of compressed gas 32. Since the acoustic pulses are torsional, fixed pivots 76 may be employed in lieu of thrust bearings, the point of each pivot 76 bearing on the midpoint, or point of zero motion, of the adjacent end surface of the transducer at its respective end of the line.

In FIG. 5 a still further arrangement of the invention is illustrated. It comprises a magnetostrictive delay line 80 having magnets 86 at its respective ends, as illustrated, which magnetically polarize the entire line 80.

In this arrangement, externally pressurized gas lubricated bearings 81 through 84, inclusive, may, in one form, be made of a suitable nonmagnetic material such as a tough plastic, each bearing including a coil winding 87 encircling the line 80. The bearings 81 through 84, inclusive, are connected to source of compressed gas 32 by pipe or tubing 30, as described above in connection with FIGS. 1 and 4. Alternatively, bearings 81 through 84 may be of a magnetic material such as iron or nickel and may be magnetized as for the bearings of FIG. 4 to produce polarization at the portions of the delay line on which they are mounted, in which case they represent transducers of the type shown in Patent No. 2,612,603.

When an alternating current electrical pulse is introduced into the winding 87 of any of the bearing assemblies 81 through 84, it causes an acoustic or ultrasonic pulse to be generated in the line at the position of the winding. As the acoustic or ultrasonic pulse passes through each of the other windings it generates electrical pulses in those windings, the time intervals between pulses being determined, of course, by the respective distances of the receiving transducers along the line from the point of origin at the transmitting transducer.

Numerous and varied modifications, rearrangements and combinations of the above-described illustrative embodiments can readily be made by those skilled in the art without departing from the spirit and scope of the principles of the invention. For example, while the illustrations are confined to showing straight rods or wires, it is obvious that the principles of the invention are readily applicable to delay lines which are more compactly formed, such as those taking the configurations of helixes, spirals, and the like. The invention is, accordingly, obviously not to be limited to the specific illustrative embodiments described.

What is claimed is:

1. In combination, an elongated delay line for the transmission of ultrasonic wave energy, and a plurality of gas lubricated bearings supporting the delay line and spaced at unequal intervals along the delay line.

2. The combination of claim 1 in which the delay line is of magnetostrictive material and the bearings are of magnetic material magnetized to magnetically polarize the portions of the delay line passing through the bearings.

3. The combination of claim 1 in which the delay line is of magnetostrictive material and the bearings include an electrical winding encircling the portion of the delay line passing through the bearing.

4. The combination of claim 1 and an externally pressurized gas lubricated thrust bearing at each end of the delay line.

5. The combination of claim 1 in which the successive intervals between bearings expressed numerically in terms of a unit of length have no large common factor.

References Cited by the Examiner
UNITED STATES PATENTS

| | | | |
|---|---|---|---|
| 2,862,385 | 12/1958 | Woods | 308—9 |
| 2,864,552 | 12/1958 | Anderson | 308—9 |
| 2,948,152 | 8/1960 | Meyer | 308—9 |
| 3,158,412 | 11/1964 | Willhoeft | 308—9 |

HERMAN KARL SAALBACH, *Primary Examiner.*